(No Model.) 2 Sheets—Sheet 1.

W. E. DELEHANTY.
TRAP FOR BATH TUBS, &c.

No. 462,305. Patented Nov. 3, 1891.

Witnesses:
J. F. Harris.
A. M. Turner.

Inventor
W. E. Delehanty
by H. M. Brown
his Atty

UNITED STATES PATENT OFFICE.

WILLIAM E. DELEHANTY, OF ALBANY, NEW YORK.

TRAP FOR BATH-TUBS, &c.

SPECIFICATION forming part of Letters Patent No. 462,305, dated November 3, 1891.

Application filed February 18, 1891. Serial No. 381,807. (No model.)

*To all whom it may concern:*

Be it known that I, WILLIAM E. DELEHANTY, a citizen of the United States, residing at Albany, in the county of Albany and State of New York, have invented certain new and useful Improvements in Traps for Bath-Tubs, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a trap for bath-tubs, water-basins, &c., that will effectually prevent the escape of sewer-gas and odors, and that can be set upon the floor of a bath-room, if desired, and allow of the bath-tub being set lower or nearer the floor than is usually done.

Figure 1:
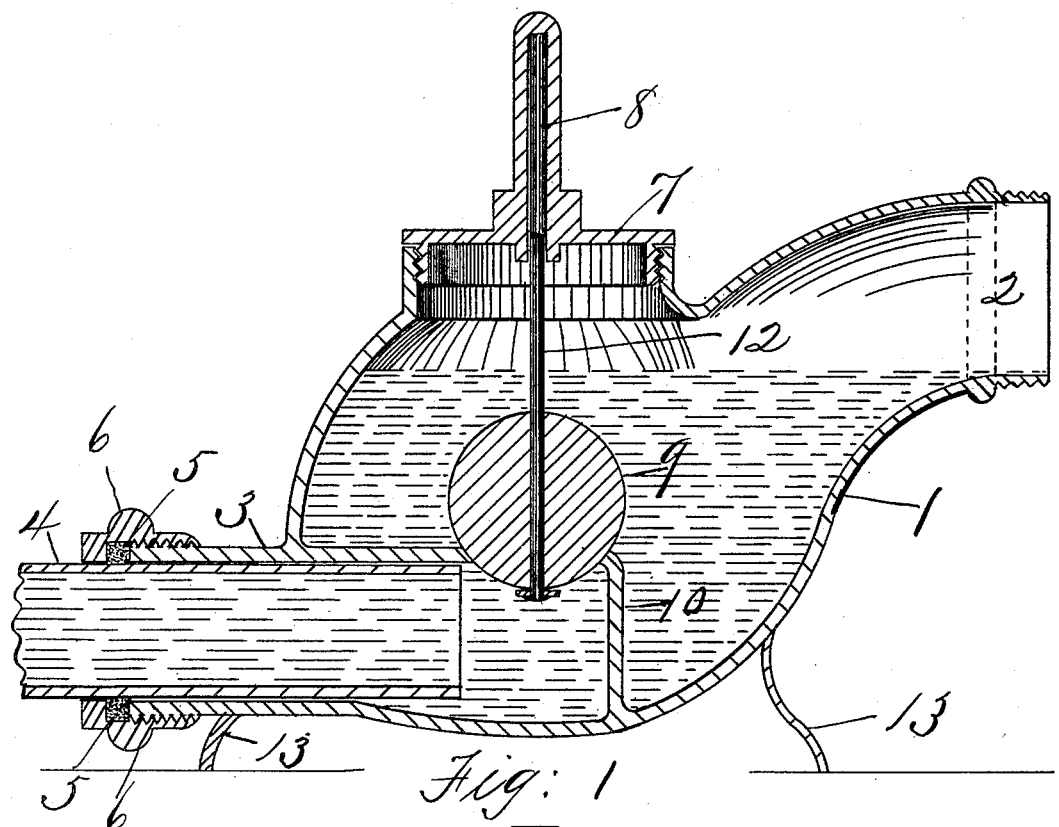
Figure 2:
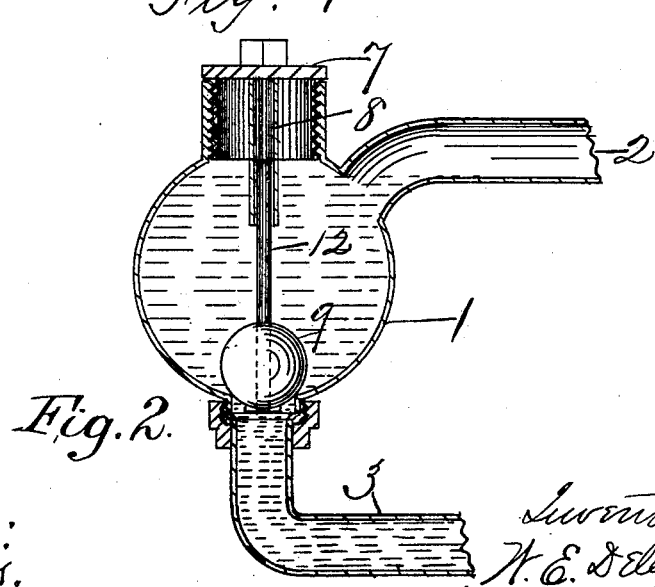
Figure 3:
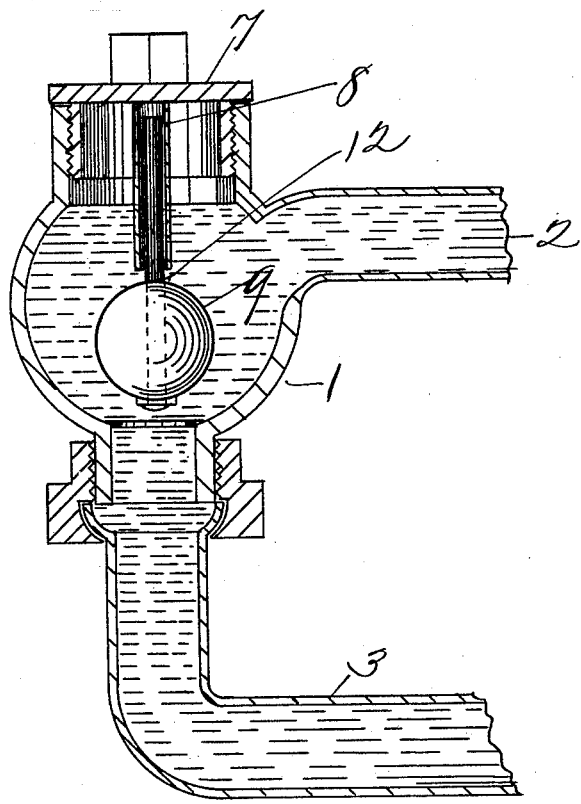

In the drawings, Figure 1 shows a vertical sectional view of one form of my trap. Fig. 2 shows a similar view of another form thereof, and Fig. 3 shows my trap with its ball-valve raised.

The body of the trap 1 may be of any configuration desired; but I prefer it as shown in Fig. 1, when set above the floor-line, and as shown in Fig. 2 when set below the floor-line. The outflow or eduction pipe 2 preferably lies above the top surface of the ball-valve 9 when the ball rests on its seat, and this is desirable in order to always preserve a water seal in the trap, as well as to have it sealed by the ball-valve 9.

In the trap 1, and at its rear side preferably, and as low down in the main chamber as possible, I provide a chamber 10, preferably oblong in configuration, and in the top of this chamber 10 I make an opening and form a seat for the ball-valve 9. This chamber 10 is preferably extended out and beyond the main body of the trap 1, as shown at 3 in Fig. 1, forming, preferably, a circular connection tube or pipe, to which the receiving waste-pipes may be connected. I prefer to make connection therewith by use of a pipe 4, entered into connecting-tube 3, forming a slip-joint and rendered water-tight by use of the union 6 and packing 5. The ball-valve 9 is composed of solid rubber or other equivalent substance and has rising from its top a stem 12.

In the top of the trap is an opening and a cover 7 therefor, having an extension-tip forming an extended chamber 8, and the stem 12 of the ball-valve 9 enters this chamber 8 and remains therein after the cover 7 is set in place, and I prefer said cover to be so set by screwing it into position, as shown. When that form of my trap shown in Fig. 1 is used, I stand it on legs or a base 13.

In Fig. 2 I show a form of my trap in which the chamber 8 is inverted or wholly within the interior of the trap, instead of rising above it, and in this form of my invention the intake-pipe 3 is connected with the lower neck of the trap by an ordinary union, and can be swung around in any direction desired, and in this form I omit the sunken or lower chamber 10. (Shown in Fig. 1.)

In setting the form of trap shown in Fig. 1 the slip-joint shown at 3 and 4 is of great service, as it enables the connection to be made after the trap is fastened to the floor and without disturbing it. The opening covered by cover 7 is longer than the ball-valve 9, so that the ball may be removed and inserted therethrough.

The operation is as follows: The water entering pipe 4, Fig. 1, fills the sunken chamber 10 and lifts the ball-valve 9 off its seat, the stem 12 rising into chamber 8, and keeping the ball directly over its seat when raised. The water then flows through the opening in the top of chamber 10 and fills the main chamber of the trap and overflows through exit-pipe 2 into any waste-pipes with which it may be connected, the ball-valve 9 remaining suspended directly over its seat during the time the trap is being flushed, as shown in Fig. 3. When the flow of water ceases, the ball drops back to its seat, and so quickly that it is impossible for the sunken chamber 10 or the main trap to be siphoned, and the top of the sunken chamber being raised above the bottom of the trap the ball-valve 9 has to sink in only a shallow body of water, thus rendering its action in regaining its seat quicker and more certain, while the guide-stem 12, sliding up and down in chamber 8, compels the ball to move in a direct and undeviating line toward its seat when flushing ceases, and away from it in said direct line when forced to rise from its seat. In Fig. 2 I do away with the sunken chamber; but I employ the stem 12 and inverted chamber 8, and in this form of my trap, when the ball rises from its seat, the stem 12, rising in the inverted chamber 8, guides the ball in a straight line and directly to and from its seat. When the trap needs cleansing, the cover 7 is removed, the ball-valve lifted out by its stem, and any refuse removed, and the parts again restored as before, and the trap is ready for use.

My trap shown in Fig. 1 is especially useful in connection with baths, wash-tubs, and similar appliances, as its height over all may be less than ten inches and its size so limited as to occupy but a trifling amount of floor-space, and as it can be made ornamental by nickeling or lacquering it or otherwise beautifying its outer surface it will present a neat appearance in any room, and it will never be necessary to cut away floors to set it, as is often necessary to do with all other forms of traps, either on account of their size or height.

Having fully described my invention, what I claim is—

A trap for the purposes described, having a body practically globular in form and having a main chamber therein and a second chamber therein, said second chamber projecting out beyond the body of the trap and having an opening in its roof closed by a rising and falling valve, the outlet-opening from the main chamber being raised high enough above the roof of the second chamber and the valve therein so that said roof and said valve will be covered by water when the trap is not being flushed, said valve having a guide arranged to prevent the water lying over the roof of said chamber keeping the valve from regaining its seat after the trap has been flushed, for the purposes described.

In testimony whereof I affix my signature in presence of two witnesses.

WILLIAM E. DELEHANTY.

Witnesses:
I. F. HARRIS,
A. M. TURNER.